United States Patent
Georgin

(10) Patent No.: US 11,273,929 B2
(45) Date of Patent: Mar. 15, 2022

(54) SYSTEMS AND METHODS FOR MEASURING LANDING GEAR STROKE FOR PROGNOSTIC AND HEALTH MANAGEMENT

(71) Applicant: Goodrich Corporation, Charlotte, NC (US)

(72) Inventor: Marc Georgin, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 204 days.

(21) Appl. No.: 16/693,716

(22) Filed: Nov. 25, 2019

(65) Prior Publication Data
US 2020/0307824 A1    Oct. 1, 2020

Related U.S. Application Data

(60) Provisional application No. 62/823,456, filed on Mar. 25, 2019.

(51) Int. Cl.
*B64D 45/00* (2006.01)
*B64C 25/60* (2006.01)

(52) U.S. Cl.
CPC .......... *B64D 45/0005* (2013.01); *B64C 25/60* (2013.01); *B64D 2045/0085* (2013.01)

(58) Field of Classification Search
CPC ........ B64D 45/0005; B64D 2045/0085; B64D 45/00; B64C 25/60; G01L 5/0071
See application file for complete search history.

(56) References Cited

U.S. PATENT DOCUMENTS

| 2,698,751 | A | * | 1/1955 | Smith | B64C 25/60 |
| | | | | | 267/64.26 |
| 10,059,464 | B2 | | 8/2018 | Clarke | |
| 2018/0364020 | A1 | * | 12/2018 | Schultz | G01B 5/0002 |
| 2019/0186984 | A1 | * | 6/2019 | Nance | B64C 25/60 |

FOREIGN PATENT DOCUMENTS

CN    201107175    8/2008

OTHER PUBLICATIONS

European Patent Office, European Search Report dated Jul. 13, 2020 in Application No. 19215156.1.

* cited by examiner

*Primary Examiner* — Valentina Xavier
(74) *Attorney, Agent, or Firm* — Snell & Wilmer L.L.P.

(57) ABSTRACT

A system for landing gear prognostic and health management may comprise a stroke measurement component and a pin configured to translate relative to the stroke measurement component. The pin may include a plurality of graduations. The pin may be configured such that a graduation corresponding to a stroke length of the landing gear may be visible through a viewing window of the stroke measurement component.

20 Claims, 6 Drawing Sheets

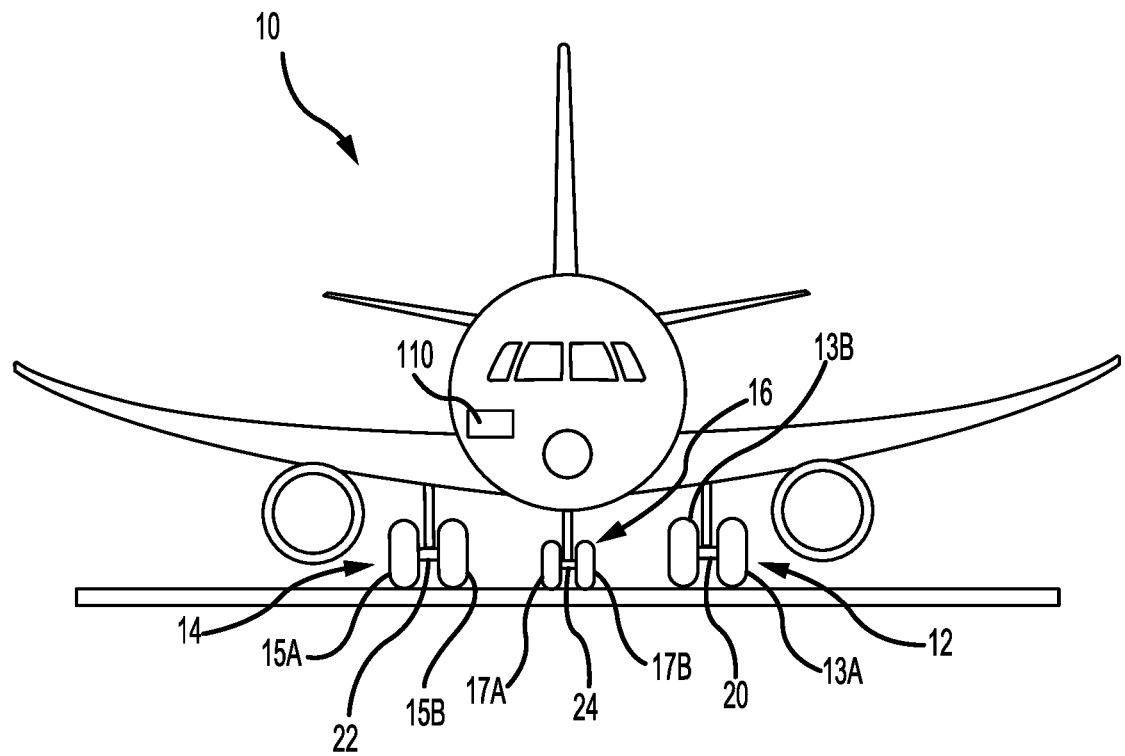
FIG.1
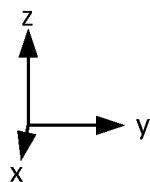

SYSTEMS AND METHODS FOR MEASURING LANDING GEAR STROKE FOR PROGNOSTIC AND HEALTH MANAGEMENT

CROSS REFERENCE TO RELATED APPLICATIONS

This application claim priority to, and the benefit of, U.S. Provisional Application Ser. No. 62/823,456, titled "SYSTEMS AND METHODS FOR MEASURING LANDING GEAR STROKE FOR PROGNOSTIC AND HEALTH MANAGEMENT," filed Mar. 25, 2019, which is incorporated herein in its entirety for all purposes by reference.

FIELD

The present disclosure relates generally to the field of landing gear, and more specifically to systems and methods for measuring landing gear stroke for prognostic and health management.

BACKGROUND

Shock absorbing devices are used in a wide variety of vehicle suspension systems for controlling motion of a vehicle and its tires with respect to the ground and for reducing transmission of transient forces from the ground to the vehicle. Shock absorbing struts are a common component in most aircraft landing gear assemblies. Prognostic and health management systems for land gear assemblies may be employed to determine when the landing gear needs servicing. The systems may make servicing determinations based on a pressure, a temperature, and a stroke of the shock strut. Measuring the stroke of the shock strut using electronic sensors tends to present challenges regarding the accuracy of the measurements, while manual measuring devices tend to present challenges with respect to accessibility and measurement consistency and accuracy.

SUMMARY

A landing gear is disclosed herein. In accordance with various embodiments, the landing gear may comprise a shock strut including a strut cylinder and a strut piston. The strut piston may be configured to telescope relative to the strut cylinder. A stroke measurement component may be coupled to the strut cylinder. A pin may be configured to translate with the strut piston and relative to the stroke measurement component. The pin may include a plurality of graduations.

In various embodiments, the stroke measurement component may define a viewing window, and, at least, a portion of the pin may be visible through the viewing window. In various embodiments, the stroke measurement component may include an indicator configured to be located closest to a graduation of the plurality of graduations that corresponds to a stroke length of the shock strut.

In various embodiments, a pressure sensor may be operatively coupled to the shock strut. In various embodiments, the pressure sensor may be configured to measure a pressure with an internal cavity of the strut cylinder.

In various embodiments, a temperature sensor may be operatively coupled to the shock strut. In various embodiments, the temperature sensor may be configured to measure a pressure with an internal cavity of the strut cylinder.

In various embodiments, an end of the pin may translate towards the stroke measurement component in response to the strut piston translating out the strut cylinder. In various embodiments, an axle may be coupled to the strut piston. The end of the pin may be opposite the axle.

A system for landing gear prognostic and health management is also disclosed herein. In accordance with various embodiments, the system may comprise a stroke measurement component including an indicator, and a pin configured to translate relative to the stroke measurement component. The pin may include a plurality of graduations. The pin may be configured such that a graduation corresponding to a stroke length of the landing gear is located proximate the indicator, the plurality of graduations including the graduation corresponding to the stroke length.

In various embodiments, the stroke measurement component may define a viewing window, and the graduation corresponding to the stroke length may be visible through the viewing window.

In various embodiments, the system may further comprise a controller, a pressure sensor in communication with the controller, a temperature sensor in communication with the controller, a stroke input device in communication with the controller, and a tangible, non-transitory memory configured to communicate with the controller. The tangible, non-transitory memory having instructions stored thereon that, in response to execution by the controller, cause the controller to perform operations which may comprise: receiving, by the controller, the stroke length from the stroke input device; receiving, by the controller, a pressure measurement from the pressure sensor; receiving, by the controller, a temperature measurement from the temperature sensor; and determining, by the controller, if a fault condition exists based on the stroke length, the pressure measurement, and the temperature measurement.

In various embodiments, determining, by the controller, if the fault condition exists may comprise determining, by the controller, an expected stroke length based on the pressure measurement and the temperature measurement; and comparing the stroke length to the expected stroke length.

In various embodiments, determining, by the controller, if the fault condition exists may comprise determining, by the controller, an expected pressure based on the stroke length and the temperature measurement; and comparing the pressure measurement to the expected pressure.

In various embodiments, an output device may be in communication with the controller, and the operations may further comprise ordering, by the controller, a fault alert to be output by the output device if the controller determines the fault condition exists.

In various embodiments, the system may further comprise a shock strut including a strut cylinder and a strut piston. The strut piston may be configured to telescope relative to the strut cylinder. The stroke measurement component may be coupled to the strut cylinder. An end of the pin may translate towards the stroke measurement component in response to the strut piston translating out the strut cylinder.

A method of making a system for landing gear prognostic and health management is also disclosed herein. In accordance with various embodiments, the method may comprise coupling a stroke measurement component to a strut cylinder of a shock strut, slidably coupling a pin to the stroke measurement component, configuring the pin to translate with a strut piston of the shock strut, and configuring a plurality of graduations located on the pin such that, as the pin translates relative to the stroke measurement component, a graduation corresponding to a stroke length of the shock strut is located proximate an indicator of the stroke measurement component.

In various embodiments, the method may further comprise configuring the pin and the stroke measurement component such that the graduation corresponding to the stroke length is visible through a viewing window defined by the stroke measurement component.

In various embodiments, the method may further comprise configuring an end of the pin to translate toward the stroke measurement component in response to the strut piston translating out the strut cylinder. The end of the pin may be located opposite an axle of the landing gear.

In various embodiments, the method may further comprise operatively coupling a pressure sensor to the strut cylinder.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 1 illustrates an aircraft, in accordance with various embodiments; and

DETAILED DESCRIPTION

Figure 2A:
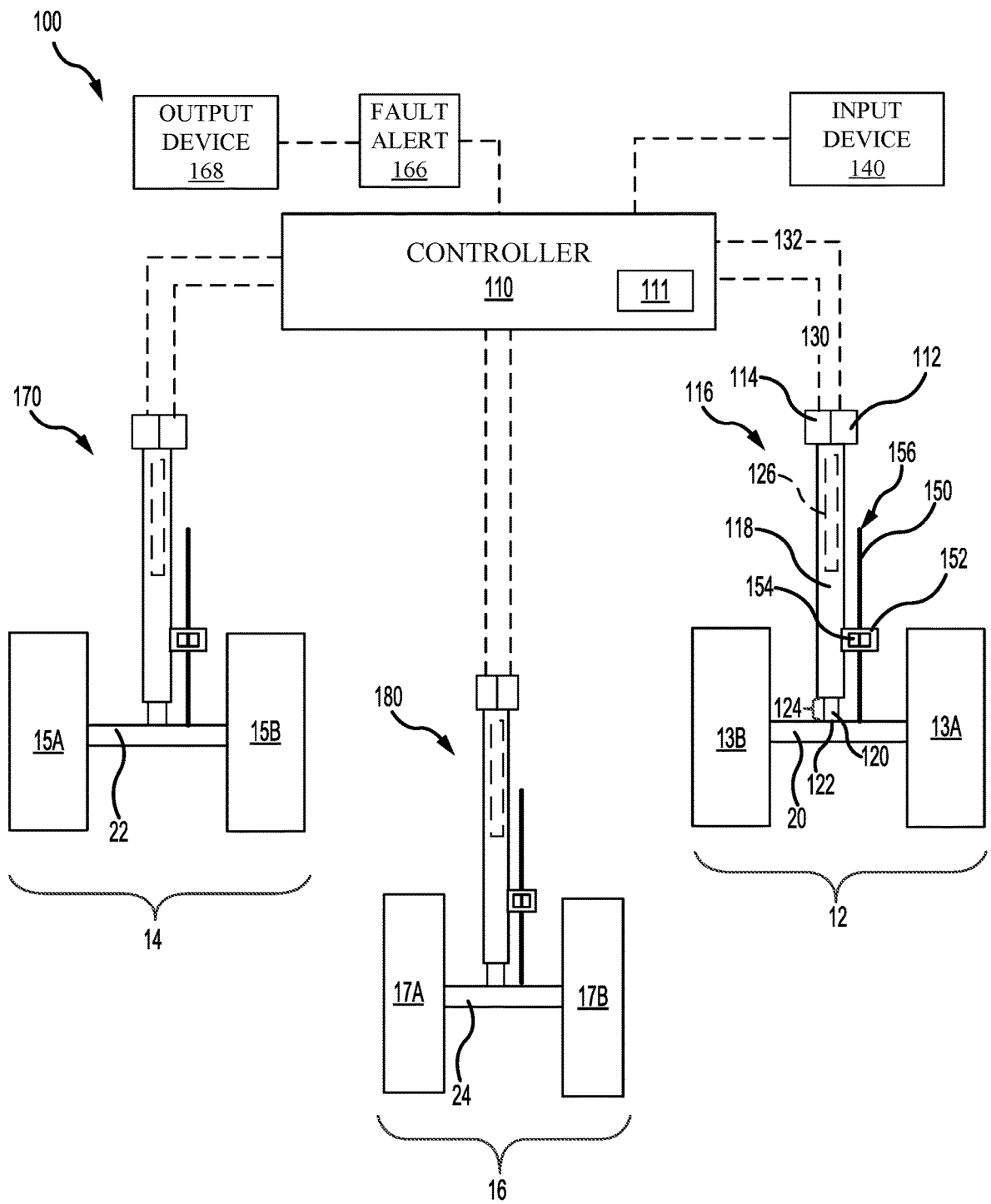
FIG. 2A illustrates a system for landing gear prognostic and health management with the landing gear in a compressed position, in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for landing gear prognostic and health management. In accordance with various embodiments, the system may be configured to make prognostic and health management decisions based on a fluid pressure, a fluid temperature, and a stroke of the shock strut. In accordance with various embodiments, a graduated pin may be coupled to the landing gear assembly. The pin may include visually recognizable graduations in, for example, 1 millimeter (mm) (0.04 inch) increments that can be visually observed by an operator or other maintenance personnel. The pin may be located through a guide with a window. During maintenance, an operator can determine a current or "real-time" stroke of the shock strut by visually reading the graduations on the pin through the window. The disclosed system may provide for precise stroke measurement without the operator having to perform manual measurements, using a ruler or other physical measuring device. The systems and methods disclosed herein may provide a simple and precise means for an operator to determine the stroke of the gear. The stroke may be used by a smart landing gear system for prognostic and health management decisions. In this regard, the disclosed systems and methods may eliminate a need for a stroke sensor and/or increase landing gear servicing efficiency.

With reference to FIG. 1, an aircraft 10 is illustrated, in accordance with various embodiments. Aircraft 10 may include landing gear such as left (or first) landing gear 12, right (or second) landing gear 14, and nose (or third) landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 may include left (or first) outboard (LOB) wheel 13A and left (or first) inboard (LIB) wheel 13B coupled by an axle 20. Right landing gear 14 may include right (or second) outboard (ROB) wheel 15A and right (or second) inboard (RIB) wheel 15B coupled by an axle 22. Nose landing gear 16 may include left nose wheel 17A and right nose wheel 17B coupled by an axle 24. The nose wheels may differ from the main wheels in that the nose wheels may not include a brake. An XYZ axes is used throughout the drawings to illustrate the axial (y), forward (x), and vertical (z) directions relative to axle 20.

Aircraft 10 may comprise a controller 110 configured to monitor left landing gear 12 and right landing gear 14. Aircraft 10 may include sensors that detect aircraft status information. Aircraft status information may mean information relating to the status of aircraft 10, for example, the presence of weight on wheels, aircraft velocity, aircraft acceleration, landing gear position, wheel position, wheel velocity, wheel acceleration, air temperature, global positioning system coordinates, and/or the like. Controller 110 may have access to various aircraft status information at any given time.

Figure 2B:
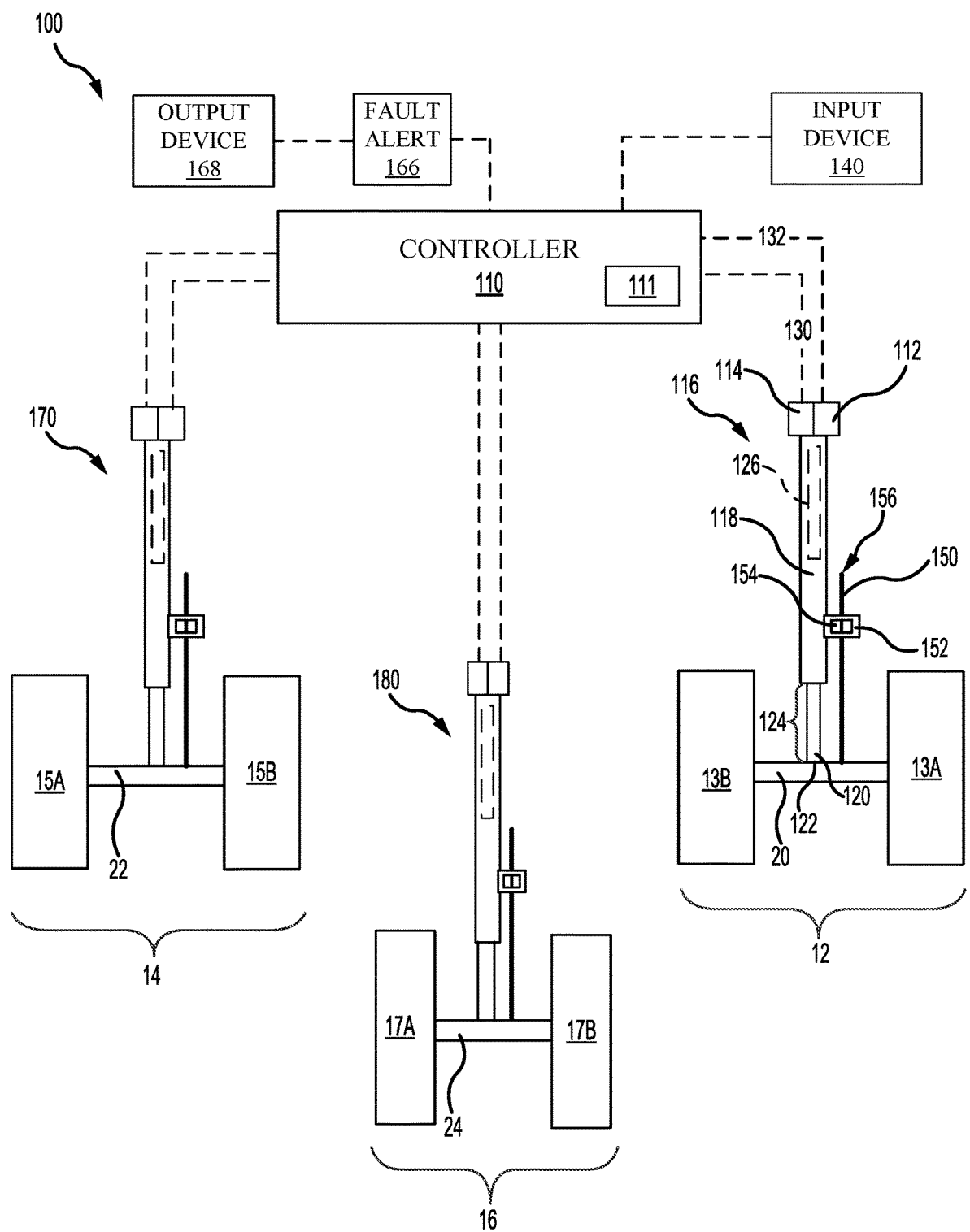
FIG. 2B illustrates a system for landing gear prognostic and health management with the landing gear in an extended position, in accordance with various embodiments.

With additional reference to FIGS. 2A and 2B, a system 100 for landing gear prognostic and health management is illustrated, in accordance with various embodiments. System 100 may be configured to monitor and make landing gear prognostic and health management decisions for aircraft 10. System 100 may include controller 110. Controller 110 may include one or more processors and may be capable of implementing logic. The processor(s) can be general purpose processor(s), digital signal processor(s) (DSPs), application specific integrated circuits (ASICs), field programmable gate arrays (FPGAs) or other programmable logic devices, discrete gates or transistor logics, discrete hardware components, or a combination thereof.

System program instructions and/or controller instructions may be loaded onto tangible, non-transitory, computer-readable medium 111 (also referred to herein as a tangible, non-transitory, memory 111) having instructions stored thereon that, in response to execution by controller 110, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

System 100 may further include one or more pressure sensor(s) 112 and one or more temperature sensor(s) 114 configured to measure a pressure and a temperature of shock strut 116 of left landing gear 12. Shock strut 116 may include a strut cylinder 118 and a strut piston 120. Strut piston 120 may be operatively coupled to strut cylinder 118. Strut cylinder 118 may be configured to receive strut piston 120 in a manner that allows the two components to telescope with respect to one another. Strut piston 120 may translate into and out strut cylinder 118, thereby absorbing and damping loads imposed on left landing gear 12. Strut piston 120 may extend from strut cylinder 118 by a stroke length 124. In various embodiments, stroke length 124 may correspond to a distance between axle 20 and strut cylinder 118. Axle 20 may be coupled to an end 122 of strut piston 120 that is opposite strut cylinder 118. In various embodiments, fluid including hydraulic fluid, oil, and/or gas, such as nitrogen, may be located within an internal volume 126 of strut cylinder 118. The internal volume 126 may consist of a single cavity or separate cavities containing different isolated fluids within the cavities. Strut piston 120 is configured to translate relative to strut cylinder 118 in response to changes in the internal cavity pressure, for example, in response to the flow of fluid into and out internal volume 126 of strut cylinder 118.

Pressure sensors 112 may be configured to measure the pressure in various locations along shock strut 116. For example, one or more pressure sensors 112 may measure a pressure within internal volume 126. Temperatures sensors 114 may be configured to measure a temperature in various locations along shock strut 116. For example, one or more temperature sensors 114 may measure a temperature within internal volume 126. Controller 110 may receive pressure measurements 130 from pressure sensors 112 and temperature measurements 132 from temperature sensors 114. Stated differently, pressure sensors 112 may output pressure measurement 130 and temperature sensors 114 may output temperature measurements 132 to controller 110. Controller 110 may be in communication with, and operatively coupled to, pressure sensors 112 and temperature sensors 114 via a wired connection, wireless connection, or any other form of connection capable of transferring data and/or signals between controller 110 and pressure sensors 112 and temperature sensors 114.

Controller 110 may provide prognostic and health management of left landing gear 12 based on stroke length 124, pressure measurements 130 from pressure sensors 112, and temperature measurements 132 from temperature sensors 114. In accordance with various embodiments, system 100 is configured such that stroke length 124 may be determined based on an operator visually determining the stroke length 124 and then inputting the observed stroke length 124 into controller 110 via a stroke input device 140. Stroke input device 140 is in communication with, and operatively coupled to, controller 110. Stroke input device 140 may be in wired communication, wireless communication, or any other type communication capable of transferring data and/or signals between controller 110 and stroke input device 140. Stroke input device 140 may be a computer, a touch screen, keyboard, knob, a portable device, such a tablet or cellular phone, or any other device capable of communicating with controller 110.

System 100 includes a pin 150 having graduations, markings, or other visual indicators which may be visible through a viewing window 154 of a stroke measurement component 152. Stroke measurement component 152 may be attached to strut cylinder 118. In various embodiments, pin 150 may be attached to axle 20 or any other structure that allows pin 150 to translates with strut piston 120 relative to strut cylinder 118. In accordance with various embodiments, pin 150 and stroke measurement component 152 are configured such that translation of strut piston 120 relative to strut cylinder 118 causes pin 150 to translate relative to stroke measurement component 152 in a complimentary manner (e.g., the same distance). FIG. 2A illustrates shock strut 116 in a compressed or retracted position. FIG. 2B illustrates shock strut 116 in an extended position, wherein end 122 of strut piston 120 has translated away from strut cylinder 118, thereby increasing stroke length 124. As stroke length 124 increases (i.e., as strut piston 120 telescopes out strut cylinder 118) End 156 of pin 150 translates toward stroke measurement component 152 in response to strut piston 120 translating out strut cylinder 118. End 156 of pin 150 is generally opposite (or distal to) axle 20 and end 122 of strut piston 120.

Figure 2C:
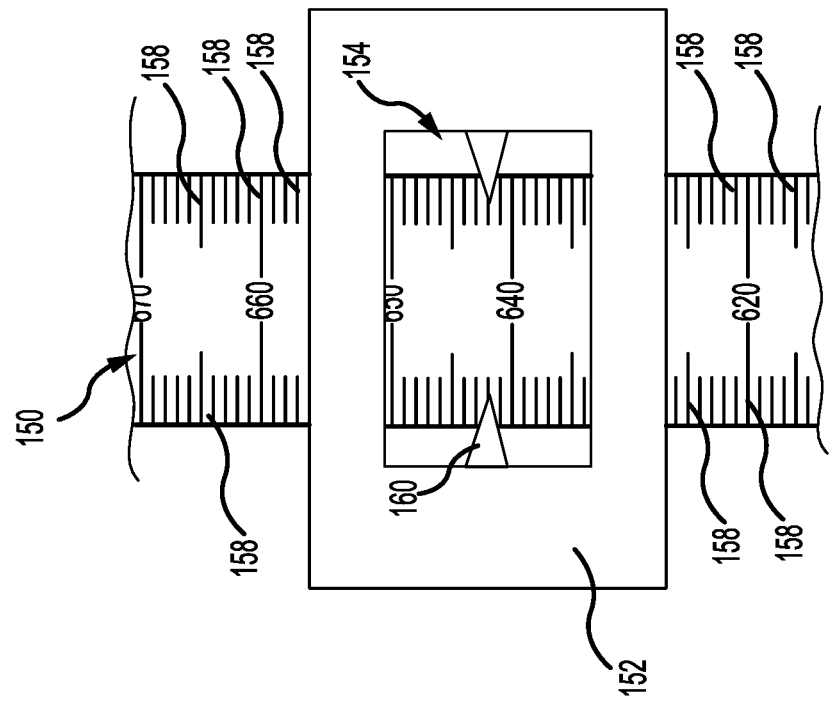
FIG. 2C illustrates a pin configured to indicate landing gear stroke with the landing gear in a compressed position, in accordance with various embodiments.
Figure 2D:
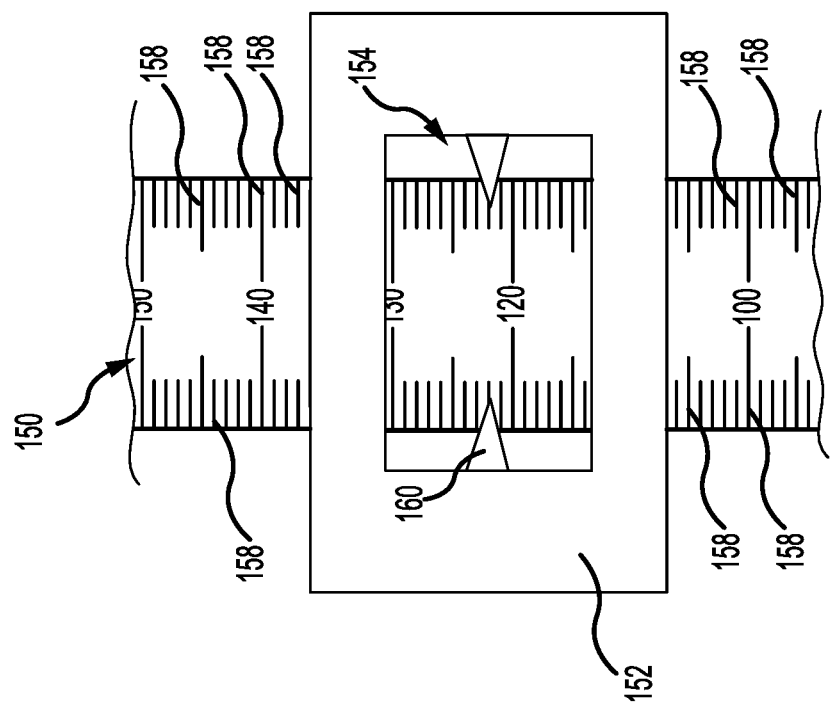
FIG. 2D illustrates a pin configured to indicate landing gear stroke with the landing gear in an extended position, in accordance with various embodiments.

With additional reference to FIGS. 2C and 2D, pin 150 may include graduations 158. Graduations 158 may be spaced at any desired interval. In various embodiments, graduations 158 may be located at 1.0 centimeter (cm) (0.40 inch) intervals (i.e., adjacent graduations 158 are 1.0 cm apart from one another). In various embodiments, graduations 158 may be located at 1.0 mm (0.04 inch) intervals, or any other desired interval. Graduations 158 are configured to be visible through viewing window 154 of stroke measurement component 152. In various embodiments, viewing window 154 may include a material, for example, a glass, configured to magnify graduations 158, such that graduations 158 are more readily viewable to an operator. Stroke measurement component 152 may include an indicator 160. Indicator 160 may include a protrusion, a pointed flange, a painted line on viewing window 154, or any other feature configured to visually indicate a graduation 158. The location of indicator 160 and stroke measurement component 152 are configured to be located proximate a graduation 158 that corresponds to stroke length 124. Thus, an operator may determine stroke length 124 by determining, visually, which graduation 158 is located closest to indicator 160. For example, FIG. 2C shows pin 150 with shock strut 116 in the compressed position shown in FIG. 2A. Indicator 160 indicates to an operator that stroke length 124 is 122.0 mm (4.8 inches). FIG. 2D shows pin 150 with shock strut 116 in the extended position shown in FIG. 2B. Indicator 160 indicates to an operator that stroke length 124 is 642.0 mm (25.3 inches). The graduation increments and stroke lengths shown in FIG. 2C and FIG. 2D are provided solely for illustrative purposes; they are not intended to limit the disclosure.

Returning to FIGS. 2A and 2B, after visually determining stroke length 124, the operator may input the observed stroke length 124 into controller 110 via stroke input device 140. Controller 110 may make prognostic and health decisions based on the observed stroke length 124 (also referred to as the "actual stroke length"), the pressure measurement from pressure sensor 112, and the temperature measurement from temperature sensor 114. In various embodiments, controller 110 may be configured to determine an expected stroke length based on pressure measurement 130 from pressure sensor 112 and temperature measurement 132 from temperature sensor 114. Controller 110 may compare the actual stroke length 124 to the expected stroke length. Controller 110 may determine a landing gear fault condition exists, in response to a determination that the actual stroke length 124 does not match the expected stroke length and/or in response to determining a difference between the actual stroke length 124 and the expected stroke length is greater than a predetermined stroke difference threshold. Similarly, controller 110 may determine an expected pressure based on the actual stroke length 124 and temperature measurement 132. Controller 110 may compare the expected pressure to the actual pressure measurement 130 received from pressure sensor 112. Controller 110 may determine a landing gear fault condition exists, in response to a determination that the actual pressure does not match the expected pressure and/or in response to determining a difference between the actual pressure and the expected pressure is greater than a predetermined pressure difference threshold.

In various embodiments, upon recognition of a landing gear fault condition, controller 110 may order a fault alert 166 to be output by an output device 168. Output device 168 may be configured to communicate information relating to shock strut 116 and/or left landing gear 12 to an operator, maintenance crew, the pilot, and/or co-pilot. For example, output device 168 may indicate that the pressure in internal volume 126 is, for example, less than an expected pressure and/or that strut piston 120 is in an unexpected position (i.e., stroke length 124 is different than expected). Output device 168 may include a display, a speaker, a network access device that sends a message to a remote terminal, and/or the like.

Controller 110 may control output device 168 to output the health status of shock strut 116 to the cockpit of the aircraft or in the form of an alert to mechanics servicing the aircraft. Fault alert 166 may be displayed as a symptom code included in an aircraft health report, which may be reviewed during a post flight check and/or during a routine maintenance inspection. In various embodiments, fault alert 166 may be displayed on output device 168 to indicate immediate maintenance is needed. In various embodiments, fault alert 166 may be a corrective action. For example, in response to determining the pressure measurement does not match the expected pressure, controller 110 may cause output device 168 to display a corrective action indicating that the nitrogen gas level of shock strut 116 is low or needs adjusting. Fault alert 166 may thus alert maintenance crew to add nitrogen or take other corrective action. Controller 110 may be configured to make real-time calculations based on the most recently entered stroke length 124 and real-time pressure measurements 130 and real-time temperature measurements 132, such that controller 110 can modify fault alert 166 and/or the corrective action in real-time. In this regard, controller 110 may command output device 168 to stop displaying fault alert 166 in response to a real-time determination that pressure measurement 130 is equal to the expected pressure.

System 100 also provides prognostic and health management of a shock strut 170 of right landing gear 14 and a shock strut 180 of nose landing gear 16. While system 100 is described with reference to shock strut 116 and left landing gear 12, it is contemplated and understood that each of shock strut 170 and right landing gear 14 and shock strut 180 and nose landing gear 16 may include the features (e.g., strut cylinder 118, strut piston 120, pressure sensors 112, temperature sensors 114, pin 150, stroke measurement component 152, viewing window 154, etc.) and functionalities as described herein with reference to shock strut 116 and left landing gear 12. In accordance with various embodiments, fault alert 166 may be configured to convey which of shock strut 116, shock strut 170, and shock strut 180 is experiencing a fault condition.

System 100 may allow for the use of smart landing gear systems for prognostic and health management on landing gear programs without the need for a stroke sensor, while providing a simple and precise means for an operator to determine the stroke length 124 of left landing gear 12, right landing gear 14, and nose landing gear 16. System 100 may increase landing gear servicing efficiency.

Figure 3A:
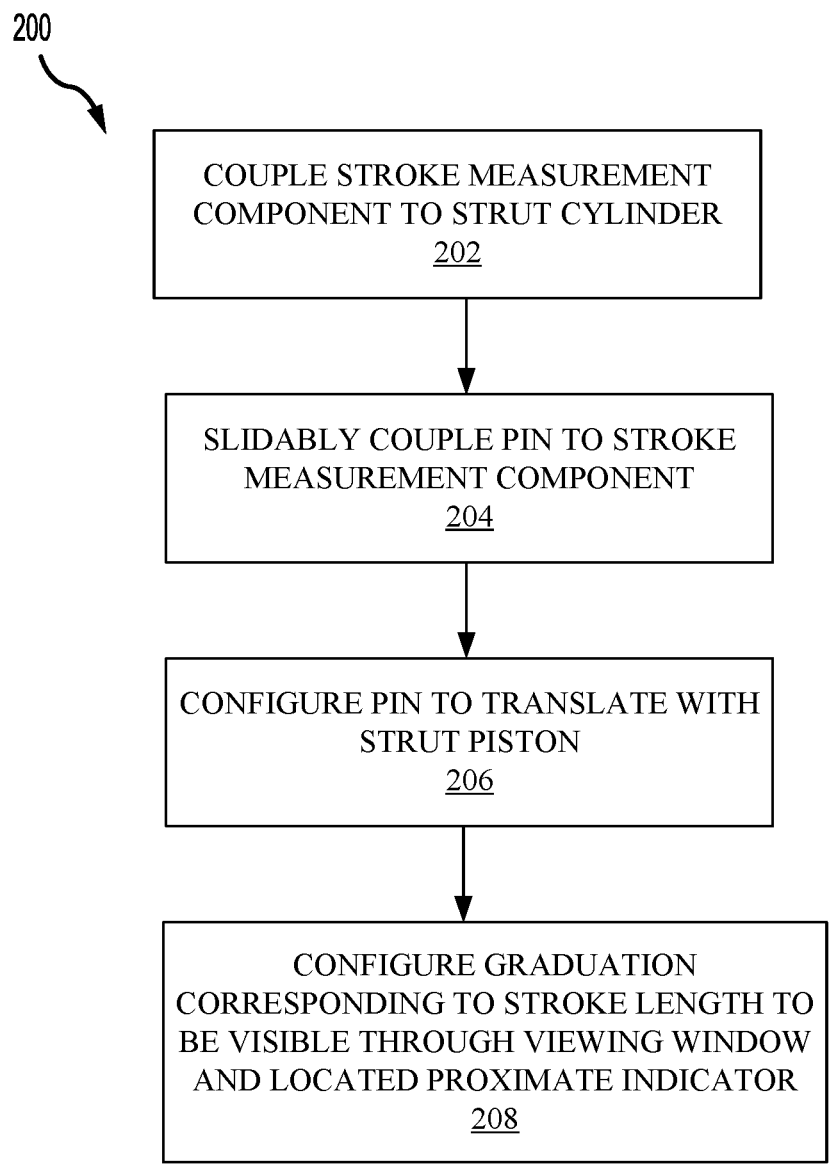
FIGS. 3A and 3B illustrate a method of making a system for landing gear prognostic and health management.

With reference to FIG. 3A, a method 200 of making a system for landing gear prognostic and health management is illustrated. In accordance with various embodiments, method 200 may include coupling a stroke measurement component to a strut cylinder of a shock strut (step 202) and slidably coupling a pin to the stroke measurement component (step 204). Method 200 may further comprise configuring the pin to translate with a strut piston of the shock strut (step 206) and configuring a graduation corresponding to a stroke length of the shock strut to be visible through a viewing window defined by the stroke measurement component and/or located proximate an indicator of the stroke measurement component (step 208).

With combined reference to FIGS. 2A, 2C, and 3A, in accordance with various embodiments, step 202 may include coupling stroke measurement component 152 to strut cylinder 118 of shock strut 116. Step 204 may include slidably coupling pin 150 to stroke measurement component 152. Step 206 may include configuring pin 150 to translate with strut piston 120. In various embodiments, step 206 may include coupling pin 150 to axle 20 or another landing gear structure configured to translate with end 122 of strut piston 120. In various embodiments, step 206 may include configuring end 156 of pin 150 to translate toward stroke measurement component 152 in response to strut piston 120 translating out strut cylinder 118. Step 208 may include configuring a graduation 158 corresponding to stroke length 124 to be visible through viewing window 154 and/or located proximate (i.e., closest to) indicator 160.

Figure 3B:
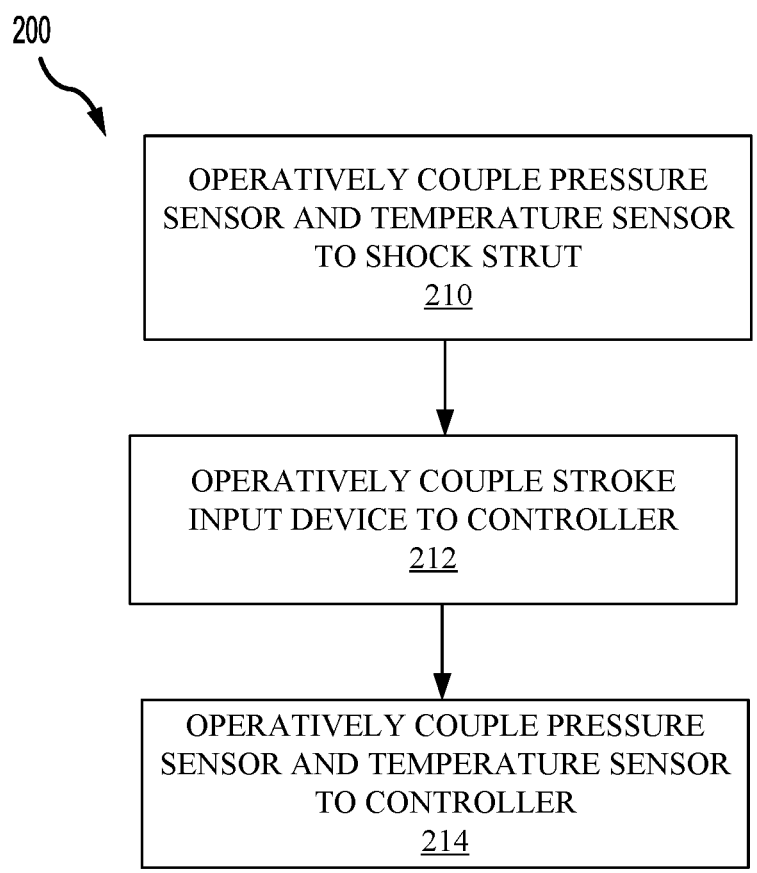

With reference to FIG. 3B, in various embodiments, method 200 may further include operatively coupling a pressure sensor configured to measure a pressure of the shock strut and a temperature sensor configured to measure a temperature of the shock strut to the shock strut (step 210). With combined reference to FIGS. 2A and 3B, in accordance with various embodiments, step 210 may include operatively coupling pressure sensor 112 and temperature sensor 114 to shock strut 116. In various embodiments, pressure sensor 112 and temperature sensor 114 may be operatively coupled to strut cylinder 118 such that pressure sensor 112 and temperature sensor 114 measure a pressure and a temperature, respectively, of internal volume 126.

In various embodiments, method 200 may further include operatively coupling a stroke input device to a controller (step 212) and operatively coupling the pressure sensor and the temperature sensor to the controller (step 214). With combined reference to FIGS. 2A and 3B, in accordance with various embodiments, step 212 may include operatively coupling stroke input device 140 to controller 110. Step 214 may include operatively coupling pressure sensor 112 and temperature sensor 114 to controller 110.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear, comprising:
a shock strut including a strut cylinder and a strut piston, the strut piston being configured to telescope relative to the strut cylinder;
a stroke measurement component coupled to the strut cylinder; and
a pin configured to translate with the strut piston and relative to the stroke measurement component, the pin including a plurality of graduations.

2. The landing gear of claim 1, wherein the stroke measurement component defines a viewing window, and wherein, at least, a portion of the pin is visible through the viewing window.

3. The landing gear of claim 2, wherein the stroke measurement component includes an indicator configured to be located closest to a graduation of the plurality of graduations that corresponds to a stroke length of the shock strut.

4. The landing gear of claim 1, further comprising a pressure sensor operatively coupled to the shock strut.

5. The landing gear of claim 4, wherein the pressure sensor is configured to measure a pressure with an internal cavity of the strut cylinder.

6. The landing gear of claim 4, further comprising a temperature sensor operatively coupled to the shock strut.

7. The landing gear of claim 6, wherein the temperature sensor is configured to measure a temperature with an internal cavity of the strut cylinder.

8. The landing gear of claim 1, wherein an end of the pin translates towards the stroke measurement component in response to the strut piston translating out the strut cylinder.

9. The landing gear of claim 8, further comprising an axle coupled to the strut piston, wherein the end of the pin is opposite the axle.

10. A system for landing gear prognostic and health management, comprising:
a stroke measurement component including an indicator; and
a pin configured to translate relative to the stroke measurement component, the pin including a plurality of graduations, wherein the pin is configured such that a graduation corresponding to a stroke length of the landing gear is located proximate the indicator, the plurality of graduations including the graduation corresponding to the stroke length.

11. The system of claim 10, wherein the stroke measurement component defines a viewing window, and wherein the graduation corresponding to the stroke length is visible through the viewing window.

12. The system of claim 11, further comprising:
a controller;
a pressure sensor in communication with the controller;
a temperature sensor in communication with the controller;
a stroke input device in communication with the controller; and
a tangible, non-transitory memory configured to communicate with the controller, the tangible, non-transitory memory having instructions stored thereon that, in response to execution by the controller, cause the controller to perform operations comprising:
receiving, by the controller, the stroke length from the stroke input device;

receiving, by the controller, a pressure measurement from the pressure sensor;

receiving, by the controller, a temperature measurement from the temperature sensor; and determining, by the controller, if a fault condition exists based on the stroke length, the pressure measurement, and the temperature measurement.

13. The system of claim 12, wherein determining, by the controller, if the fault condition exists comprises:

determining, by the controller, an expected stroke length based on the pressure measurement and the temperature measurement; and comparing the stroke length to the expected stroke length.

14. The system of claim 12, wherein determining, by the controller, if the fault condition exists comprises:

determining, by the controller, an expected pressure based on the stroke length and the temperature measurement; and comparing the pressure measurement to the expected pressure.

15. The system of claim 12, further comprising an output device in communication with the controller, wherein the operations further comprise:

ordering, by the controller, a fault alert to be output by the output device if the controller determines the fault condition exists.

16. The system of claim 10, further comprising a shock strut including a strut cylinder and a strut piston, the strut piston being configured to telescope relative to the strut cylinder, wherein the stroke measurement component is coupled to the strut cylinder, and wherein an end of the pin translates towards the stroke measurement component in response to the strut piston translating out the strut cylinder.

17. A method of making a system for landing gear prognostic and health management, the method comprising:

coupling a stroke measurement component to a strut cylinder of a shock strut;

slidably coupling a pin to the stroke measurement component;

configuring the pin to translate with a strut piston of the shock strut; and configuring a plurality of graduations located on the pin such that as the pin translates relative to the stroke measurement component a graduation corresponding to a stroke length of the shock strut is located proximate an indicator of the stroke measurement component.

18. The method of claim 17, further comprising configuring the pin and the stroke measurement component such that the graduation corresponding to the stroke length is visible through a viewing window defined by the stroke measurement component.

19. The method of claim 17, further comprising configuring an end of the pin to translate toward the stroke measurement component in response to the strut piston translating out the strut cylinder, the end of the pin being opposite an axle of the landing gear.

20. The method of claim 17, further comprising operatively coupling a pressure sensor to the strut cylinder.

* * * * *